US006623552B1

(12) United States Patent
West

(10) Patent No.: US 6,623,552 B1
(45) Date of Patent: Sep. 23, 2003

(54) ALUMINUM SALT-AMINE COMPLEX UV INHIBITOR FOR WOOD

(76) Inventor: Michael Howard West, 54 S. Crockett Rd., Senatobia, MS (US) 38668

( * ) Notice: Subject to any disclaimer, the term of this patent is extended or adjusted under 35 U.S.C. 154(b) by 40 days.

(21) Appl. No.: 10/291,354

(22) Filed: Nov. 12, 2002

(51) Int. Cl.[7] .................................... A01N 33/02
(52) U.S. Cl. .................................... 106/18.32; 106/15.05; 424/682; 514/663
(58) Field of Search .................................... 106/18.32, 15.05; 424/682; 514/663

(56) References Cited

U.S. PATENT DOCUMENTS 4,143,153 A * 3/1979 Pommer et al. ............ 514/494
4,144,260 A * 3/1979 Zoller et al. ................ 556/182
4,337,093 A * 6/1982 Metzner et al. .......... 106/18.33
4,764,632 A * 8/1988 Cohen ......................... 556/27
5,880,143 A * 3/1999 Goettsche et al. .......... 514/383
6,211,218 B1 * 4/2001 Goettsche et al. .......... 514/383
6,306,202 B1 * 10/2001 West ......................... 106/18.3

* cited by examiner

*Primary Examiner*—Anthony J. Green

(57) ABSTRACT

A composition for protecting wood from ultraviolet light degradation, for protecting naturally occurring biological agents in the wood from ultraviolet light degradation, and for protecting organic biological agents added to the wood from ultraviolet light degradation which comprises an aluminum salt-amine compound complex wherein the weight ratio of amine compound to aluminum salt ranges from 1 to 10 to 10 to 1.

3 Claims, No Drawings

ALUMINUM SALT-AMINE COMPLEX UV INHIBITOR FOR WOOD

CROSS REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO A MICROFICHE APPENDIX

NOT APPLICABLE

BACKGROUND OF THE INVENTION

The field of endeavor to which this invention pertains is the preparation and use of aluminum salt-amine compound complex compositions as ultraviolet light inhibitors for wood, for biological protection agents naturally occurring in the wood, and for organic biological protection agents added to the wood before, after, or with the compositions of my invention. Greathouse and Wessel in *Deterioration of Materials* teach that sunlight probably accounts for the most widespread destruction of materials and equipment used outdoors. Its effectiveness as an agent of degradation lies in the fact that certain portions of the sun's spectrum possess the property, either alone or in the presence of other agents like moisture or oxygen, of being able to bring about chemical reactions in materials undergoing irradiation. The short ultraviolet components of sunlight possess the most energy, and they are the most destructive of wood.

My invention relates to aluminum salts which may be.strongly alkaline such as sodium aluminate, moderately acidic such as aluminum acetate, or strongly acidic such as aluminum nitrate. The strongly alkaline and strongly acidic salts are desirable because they are easily prepared, readily available, and low in cost. My invention relates to all amine compounds, but dimethylalkylamines and their salts are especially desirable. The aluminum salt-amine compound complexes which exhibit low health and fire hazards, as well as preferred handling properties for wood treating, are preferred in the practice of my invention.

The preferred compositions of my invention are water soluble, and are used in water dilution for wood treating. Copper, zinc, and chromium compounds have served well as water borne ultraviolet light protection agents, as well as biological protection agents, for wood. Now, these metals are under increasing EPA regulation pressure due to environmental concerns. Aluminum is the third most common element in our environment, following oxygen and silicon. Aluminum salts convert to aluminum compounds no different from natural aluminum compounds when they decompose. Amine compounds are composed of carbon, nitrogen, oxygen, and hydrogen so they do not present an environmental hazard when they decompose.

Like zinc and chromium compounds, the compounds of my invention fix to the cellulose component of wood, and resist leaching. This physical modification of the cellulose molecule inhibits enzymatic as well as light degradation of the wood, and the chemical linkage with the cellulose reduces the amount of natural and added biological protection agents lost.

BRIEF SUMMARY OF THE INVENTION

My invention relates to a composition for protecting wood from ultraviolet light degradation, for protecting naturally occurring biological agents in the wood from ultraviolet light degradation, and for protecting organic biological agents added to the wood from ultraviolet light degradation which comprises an aluminum salt-amine compound complex wherein the weight ratio of amine compound to aluminum salt ranges from 1 to 10 to 10 to 1. It is the object of my invention to provide a composition for long term protection of wood used above ground and exposed to the sunlight wherein the cost for wood treating is lower, and environmental hazards reduced, compared to current commercial practice.

DETAILED DESCRIPTION OF THE INVENTION

The preferred embodiment of my invention utilizes a complex from the reaction of aluminum nitrate and dimethylcocoamine. Aluminum nitrate presents a considerable health hazard due to its acidity. Dimethylcocoamine presents a health hazard due to its alkalinity. When the two components are combined in preferred ratios with a slight excess by weight of aluminum nitrate, health hazards are greatly reduced. At preferred ratios, it is possible to produce concentrates, for dilution with water, which are stable, low in health hazards, and low in cost relative to commercial wood preservatives. The water dilutions of my invention compare favorable with copper-chromium-arsenic commercial compositions for penetrating seasoned wood.

Example 1 illustrates a preferred composition of my invention. Should higher ratios of amine to aluminum salt be used, it will be necessary to add an acid for solution stability. Aluminum nitrate is available commercially as a 60% solution in water. Dimethylcocoamine is available as a 100% liquid which is water insoluble. When the two are combined as in Example 1, they form a water soluble complex.

EXAMPLE 1

| | |
|---|---|
| Water | 50 pbw |
| 60% aluminum nitrate | 35 pbw |
| Dimethylcocoamine | 15 pbw |

The composition from Example 1 was diluted to a 10% concentration in water, and used to treat seasoned cedar and pine boards by a one week soak. These treated boards and untreated controls were exposed at 45 degrees facing south under tree shade for 7 years. At the end of this period, the treated boards were all bright and free of the erosion which is a trademark of sunlight and weathering degradation. The pine controls were destroyed by fungal and weather degradation. The cedar controls were darkened, and they exhibited the trademark erosion from ultraviolet light and weathering especially in the spring wood. It was not surprising to find the cellulose modification, resulting from a preferred composition of my invention, interfering with the chemical reactions of enzymes as well as the chemical reactions from sunlight. The compositions of my invention can be used with many wood preservatives.

I claim:

1. A composition for protecting wood from ultraviolet light degradation which comprises an aluminum salt-dimethylalkylamine compound complex wherein the weight ratio of dimethylalkylamine compound to aluminum salt ranges from 1 to 10 to 10 to 1.

2. A composition for protecting naturally occurring biological protection agents in wood from ultraviolet light degradation which comprises an aluminum salt-dimethylalkylamine compound complex wherein the weight ratio of dimethylalkylamine compound to aluminum salt ranges from 1 to 10 to 10 to 1.

3. A composition for protecting organic biological protection agents added to wood from ultraviolet light degradation which comprises an aluminum salt-dimethylalkylamine compound complex wherein the weight ratio of dimethylalkylamine compound to aluminum salt ranges from 1 to 10 to 10 to 1.

* * * * *